United States Patent [19]

Decker et al.

[11] Patent Number: 5,791,473
[45] Date of Patent: Aug. 11, 1998

[54] FILM CANISTER WITH INDEPENDENT SEALING SURFACES

[75] Inventors: Victoria Lynn Decker; Michael William Didas, both of Rochester; William Gerald Hoyt, Churchville, all of N.Y.

[73] Assignee: Eastman Kodak Company, Rochester, N.Y.

[21] Appl. No.: 801,236

[22] Filed: Feb. 19, 1997

Related U.S. Application Data

[63] Continuation of Ser. No. 455,957, May 31, 1995, abandoned.

[51] Int. Cl.$^6$ ............................................. B65D 85/67
[52] U.S. Cl. .................... 206/407; 206/316.1; 220/366.1; 220/785; 220/789
[58] Field of Search ........................... 206/316.1, 389, 206/407; 220/307, 366.1, 789, 785

[56] References Cited

U.S. PATENT DOCUMENTS

| | | | |
|---|---|---|---|
| 3,941,275 | 3/1976 | Simmons | 220/366.1 X |
| 4,474,305 | 10/1984 | Marco . | |
| 4,639,386 | 1/1987 | Akao . | |
| 4,770,318 | 9/1988 | Earl | 220/307 |
| 4,801,011 | 1/1989 | Desdoigts et al. . | |
| 4,844,961 | 7/1989 | Akao . | |
| 4,921,737 | 5/1990 | Akao | 206/407 X |
| 4,960,676 | 10/1990 | Akao et al. | 206/407 X |
| 5,106,665 | 4/1992 | Akao et al. . | |
| 5,225,259 | 7/1993 | Akao | 206/407 X |
| 5,240,754 | 8/1993 | Akao et al. | 206/407 X |
| 5,368,178 | 11/1994 | Towns et al. . | |
| 5,443,872 | 8/1995 | Akao et al. | 206/407 X |

FOREIGN PATENT DOCUMENTS 2243362  10/1991  United Kingdom ................ 206/407

*Primary Examiner*—Bryon P. Gehman
*Attorney, Agent, or Firm*—Robert Luke Walker

[57] ABSTRACT

A reusable container for a photographic film includes a body section having an open end, and a cap for covering the open end including an engagement portion for engaging the open end of the container body. According to the invention, the engagement portion of the cap includes a circumferential rib member for engaging a corresponding recess of the body for releasably securing the cap to the body, as well as a separately defined sealing surface having a radius which is larger than a corresponding sealing surface of the body in order to tightly seal and thereby prevent the significant passage of light, dust or moisture into the container when the cap is secured to the body of the container.

20 Claims, 6 Drawing Sheets

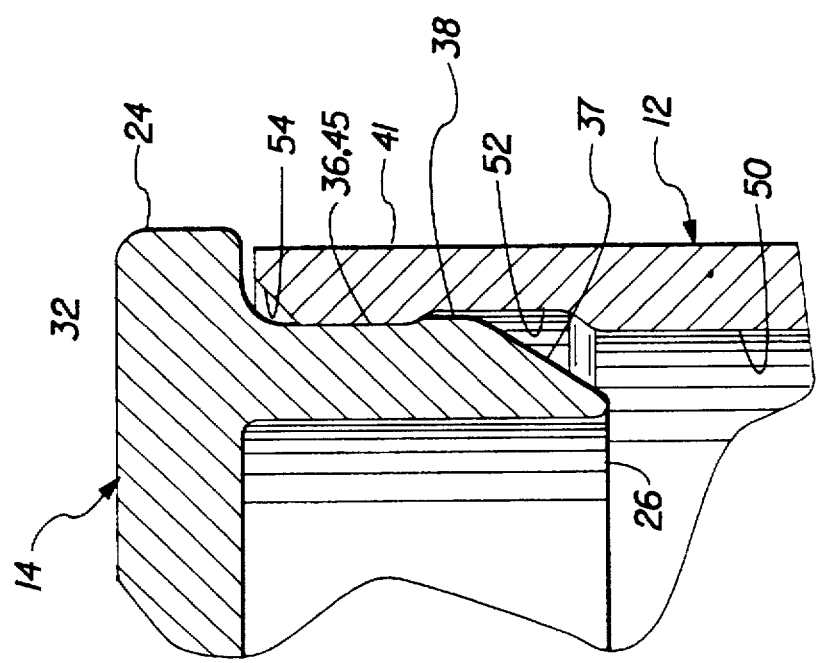

5,791,473

FILM CANISTER WITH INDEPENDENT SEALING SURFACES

This is a continuation of application Ser. No. 08/455,957, filed May 31, 1995, now abandoned.

CROSS-REFERENCE TO RELATED APPLICATION(S)

Reference is made to commonly assigned application Ser. No. 08/455006 (now U.S. Pat. No. 5,655,658) [Attorney Docket No. 71730], entitled: FILM CANISTER filed concurrently herewith in the names of Alex Saveliev, Victoria L. Decker and Michael W. Didas, and which is assigned to the assignee of this application.

1. Field of the Invention

The invention relates generally to the field of photography. More specifically, the invention relates to an improved moisture and light resistant container for a photographic film cartridge.

2. Background of the Invention

Film containers or canisters are known for storing film cassettes or cartridges having an exposed or unexposed film contained within the cassette. Previously, a typical container for a 35 mm film cassette comprised an open cylindrical receptacle, commonly referred to as a "can", for storing the film cassette, and a press-on cap or cover which covers the opening to the can to provide a moisture-proof light seal. An example of such a container is disclosed in U.S. Pat. No. 4,639,386, granted Jan. 27, 1987. The can and the cap are usually molded from a plastic material, e.g., black high density polyethylene (HDPE), which is moisture proof, opaque, and chemically inert.

A cover for a film canister serves two primary functions. First, the cover must seal to the can body to prevent moisture and light from being transmitted through the opening of the can in order to protect a stored film cartridge. Second, the cover must also be releasably attachable and be retained by the can.

There are two types of 135 film container covers generally found in the art: plug-type and snap-type covers. A snap-type cover seals to the body of the can by the mating of cover surfaces to internal surfaces of the can. Such a cover is then retained using features which are external to the can outside diameter. A plug-type cover, on the other hand, provides seal and retention features that are both located inside the can without requiring any overhanging features external to the can, with the possible exceptions of those features required only for ease of opening the cover, such as a thumb tab.

In plug-type covers, such as those described in U.S. Pat. No. 4,844,961, among others, the seal and retention features of the cover are combined, such as by tightly fitting a radial bead of the cover with a corresponding groove in the interior of the can. Though relatively effective retention of the cover to the can is provided, the above design leaves little room to separately optimize either the sealing and retention characteristics of the container without sacrificing the remaining characteristic.

SUMMARY OF THE INVENTION

The present invention is directed to overcoming one or more of the problems set forth above. Briefly summarized, according to one aspect of the present invention, there is provided a cylindrical container for a photographic film cassette comprising a body having an interior sized to retain said film cassette and an open end;

a cover for engaging the open end of said body;

means for releasably securing the cover to said body; and means for sealing the interior of said body from moisture and dust when said cover is secured by said securing means to said body, is characterized in that:

said cover includes a circumferential rib member for engaging an inner recessed portion of said body adjacent said open end to releasably secure said cover to said body, and a radial sealing surface for engaging an inner radial sealing surface of said body, wherein the radius of said inner radial surface is less than the radius of the cover sealing surface.

According to another aspect of the present invention, there is provided a cylindrical container for a photographic film comprising a body and a cover having an engageable portion for engaging an open end of said body, characterized in that:

said engageable portion includes a circumferential rib member for engaging a recess disposed along an inner radial wall of said body for retaining said cover to said body, and said body includes a inner wall portion having a first radial sealing surface for engaging a second outer radial surface of said engageable portion wherein the radius of said first sealing surface is greater than the radius of the second sealing surface relative to a center axis of said container to tightly seal said container from moisture, light, or dust.

An advantageous aspect of the present invention is that a container is provided which separately provide sealing and retention features, thereby maximizing the benefits available to each. The ability to optimize the sealing and retaining characteristics of the container provides an easily sealable container having a modest release force for a user, and in which the seal is efficient in insulating a stored film cassette from environmental effects such as dust, moisture or light.

These and other aspects, objects, features and advantages of the present invention will be more clearly understood and appreciated from a review of the following Detailed Description of the Invention and appended claims, and by reference to the accompanying drawings.

BRIEF DESCRIPTION OF THE DRAWINGS

FIG. 7 is the enlarged sectional view of FIG. 6 of the film canister, showing in particular, the retention features of the present invention.

DETAILED DESCRIPTION OF THE INVENTION

The invention is hereinafter described according to a preferred embodiment. It should be readily apparent, however, that the foregoing description should not be limited to the specific embodiment described.

Figure 1:
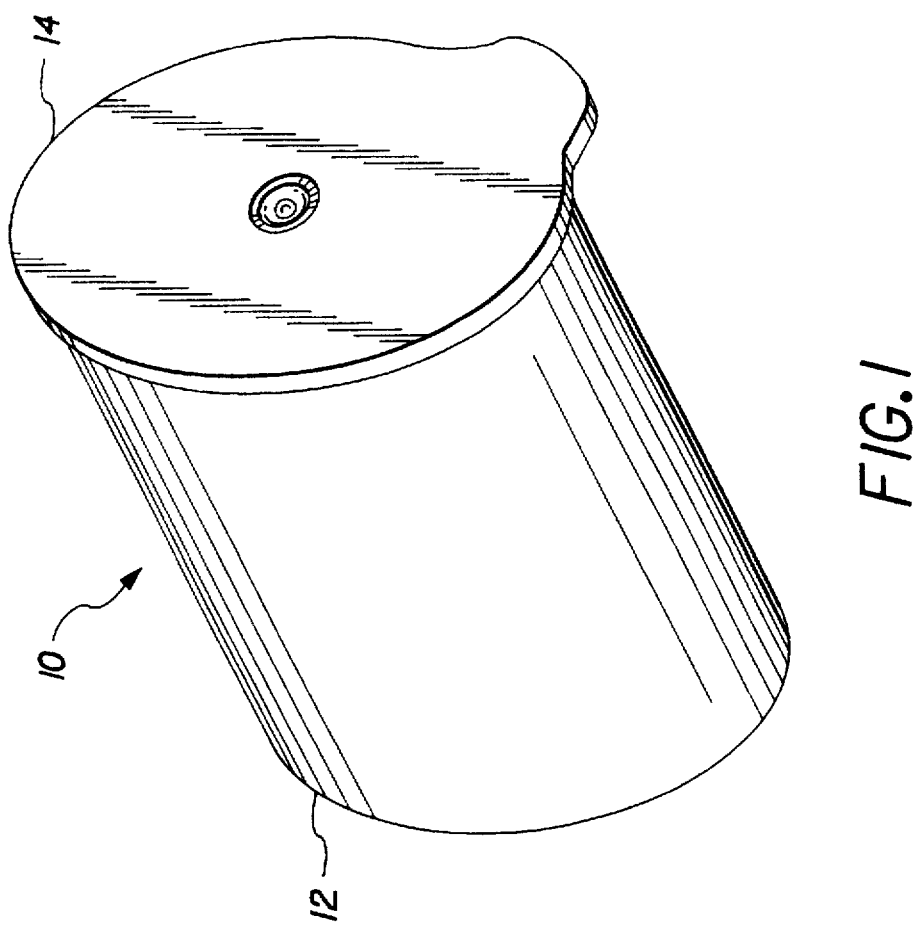
FIG. 1 is a perspective view of a film canister in accordance with a preferred embodiment of the present invention.

Referring now to the FIGURES, and specifically to FIG. 1, there is shown an elevated perspective view of a reusable film canister 10 having an elliptical cross section for containing a similarly shaped film cartridge (not shown). The canister 10 includes a body 12 and a cover 14, each being made from a moisture resistant plastic material, e.g. high density polyethylene (HDPE), and formed in an injection molding process as is commonly known in the field. Most preferably, the cover 14 and the body 12 are made from the same material.

Figure 2:
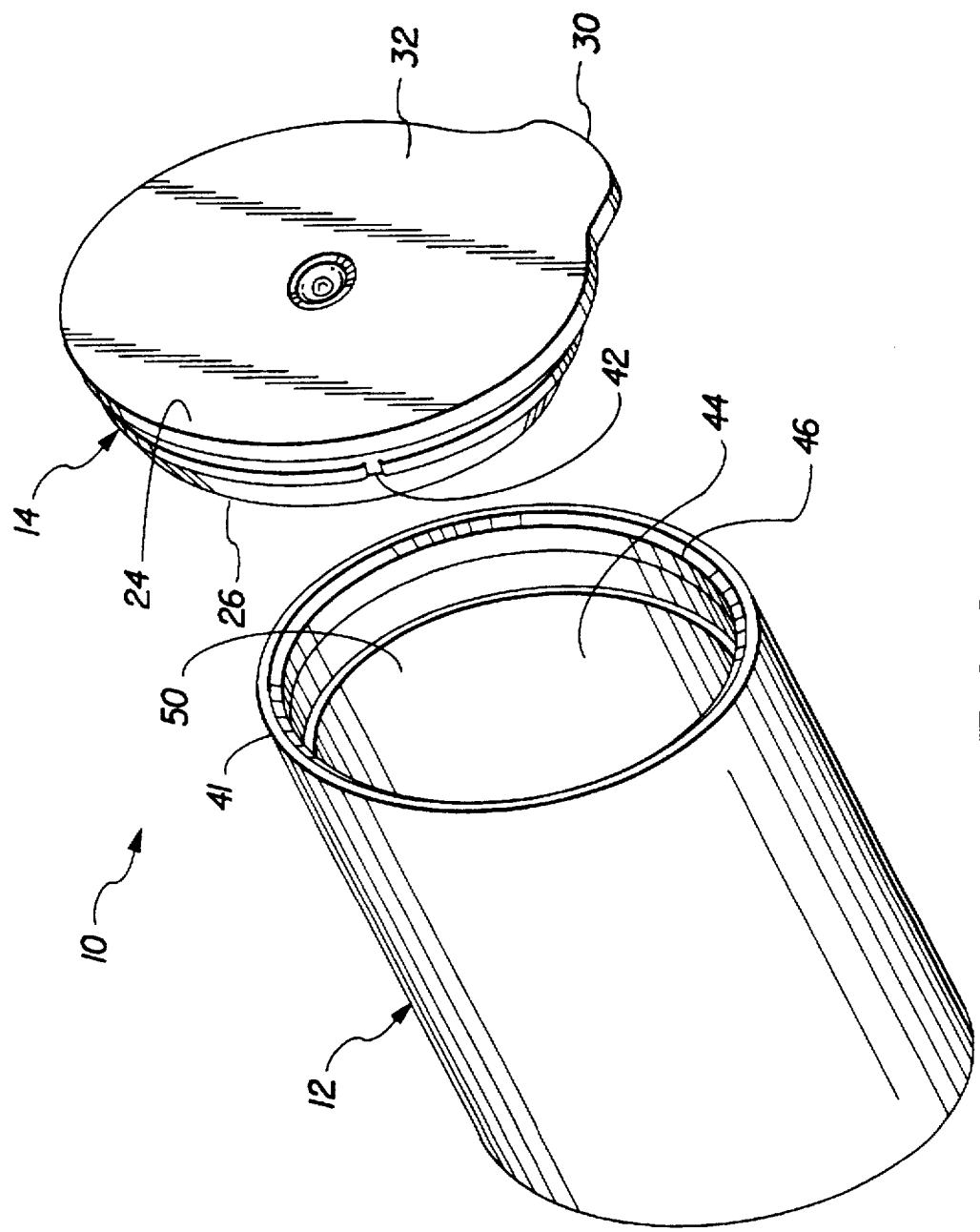
FIG. 2 is the perspective view of FIG. 1 showing the film canister with the cover removed.
Figure 3:
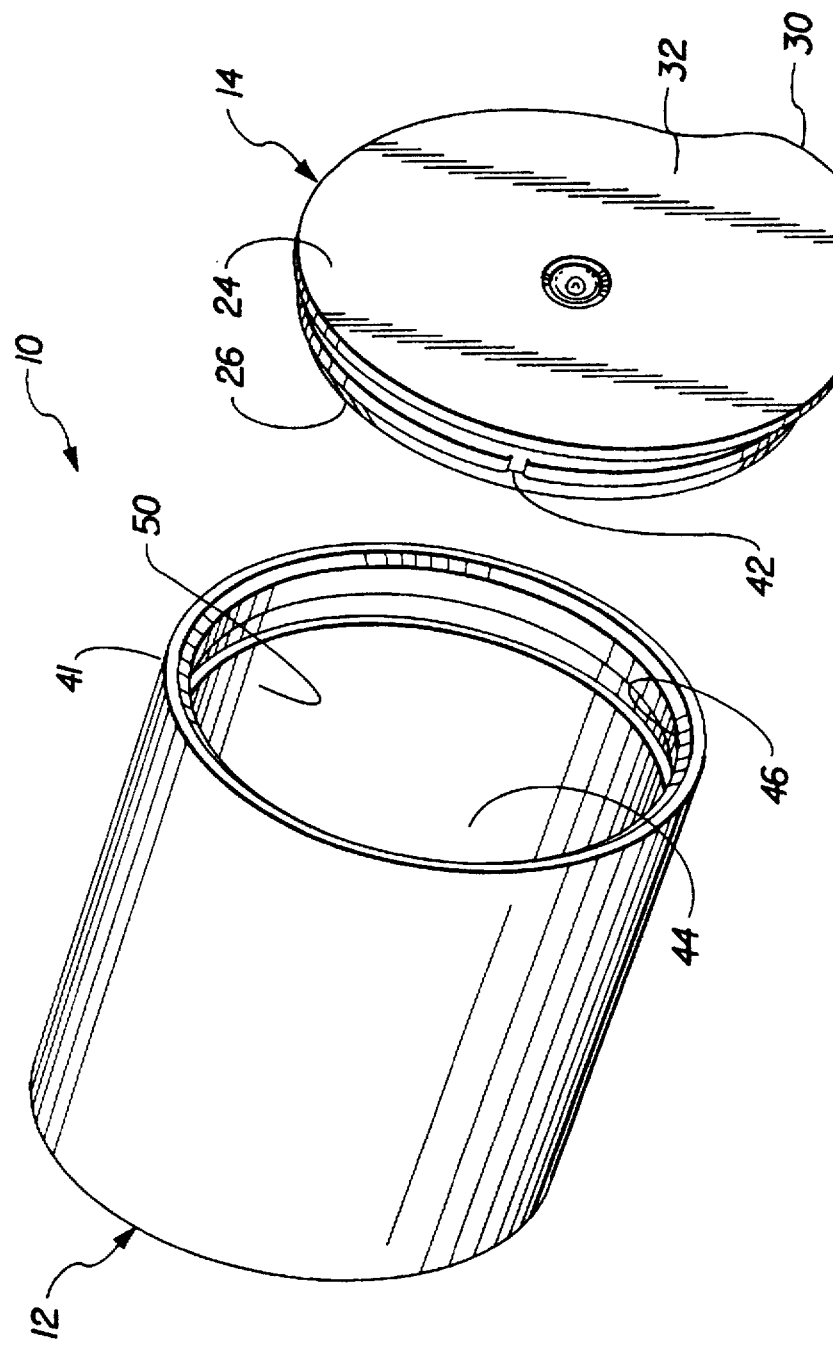
FIG. 3 is the perspective view of the film canister of FIG. 2 rotated clockwise by 30 degrees.

FIGS. 2 and 3 illustrate the same perspective view of FIG. 1, showing the canister 10 with the cover 14 removed, revealing that the cover 14 is a plug-type cover, and the body 12 includes an interior cavity 44 which is sized and configured for storing a film cartridge (not shown), the cavity being defined by a circumferential inner side wall 50. The canister 10 is defined by a top necked portion 41 having an open end 46 for interfacing with the cover 14, FIG. 7, as described in greater detail below. The body interior 44 is sized to retain a film cassette (not shown).

Figure 4:
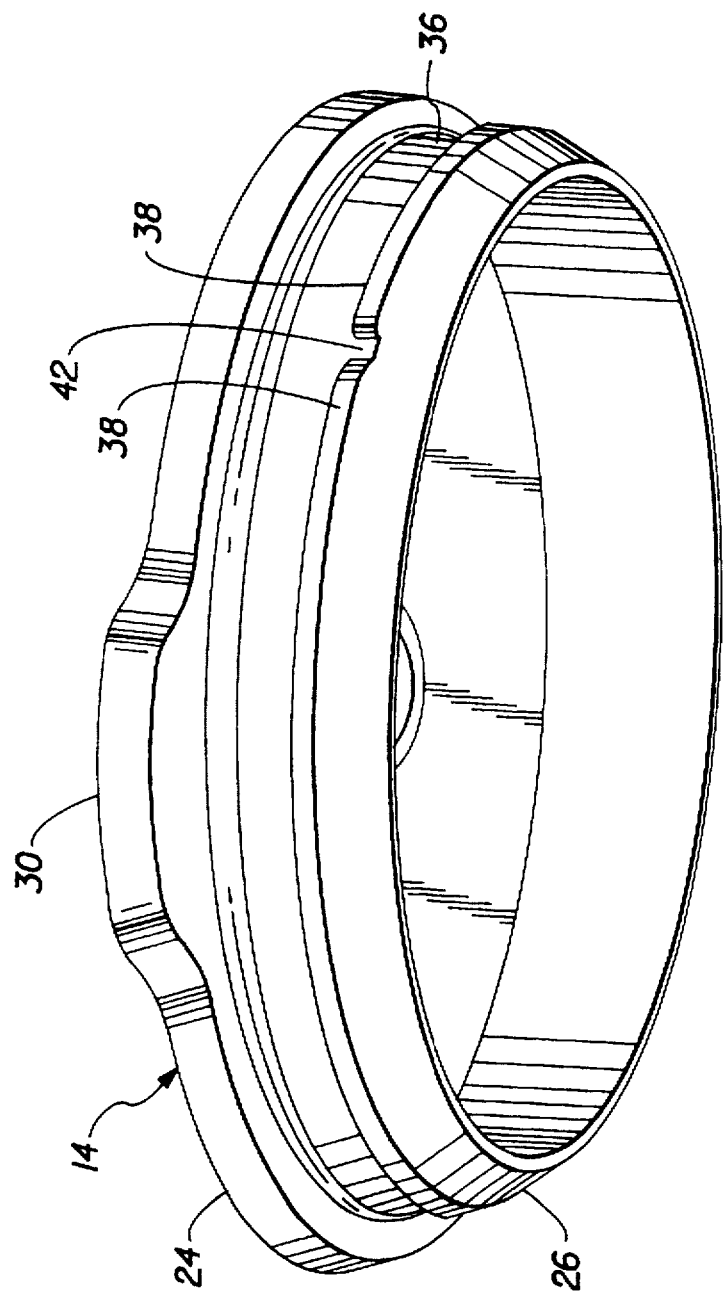
FIG. 4 is an enlarged perspective view of the cover which is shown in the preceding FIGS. 1-3.

Referring now to FIGS. 2-4, and as noted the cover 14 is of the plug-type. The cover 14, having an elliptical cross section, is further defined by an upper lid portion 24 and a lower engaging portion 26. The upper lid portion 24 is defined by outermost dimensions which are slightly greater than that of the body 12, see FIG. 5, as well as a thumb tab 30, commonly known in the art to provide ease in repeatably removing the cover 14 from the body 12. The upper lid portion 24 also includes a generally flat top surface 32. The provision of a flat top surface 32 allows the labeling of the contents of the container either by a handwritten or pre-printed label (not shown) which can be affixed thereto.

Referring to FIGS. 4-7, the lower engaging section 26 of the cover 14 fits within the top necked portion 41 of the body 12. The engaging portion 26 includes a substantially vertical (according to the embodiment shown) inner radial sealing surface 36 which is circumferentially disposed about axis 56 to correspond to the elliptical cross section of the cover 14. Below the sealing surface 36, a circumferential rib member 38 is provided, which extends radially outwardly beyond the radius defined by the cover sealing surface 36. A depending end 37 of the lower section 26 is tapered inwardly from the rib member 38.

According to the described embodiment, the rib retaining member 38 extends radially outward a distance of about 0.002 to 0.006 inches (0.51 to 1.52 mm) from the radius of the cover sealing surface 36.

Figure 6:
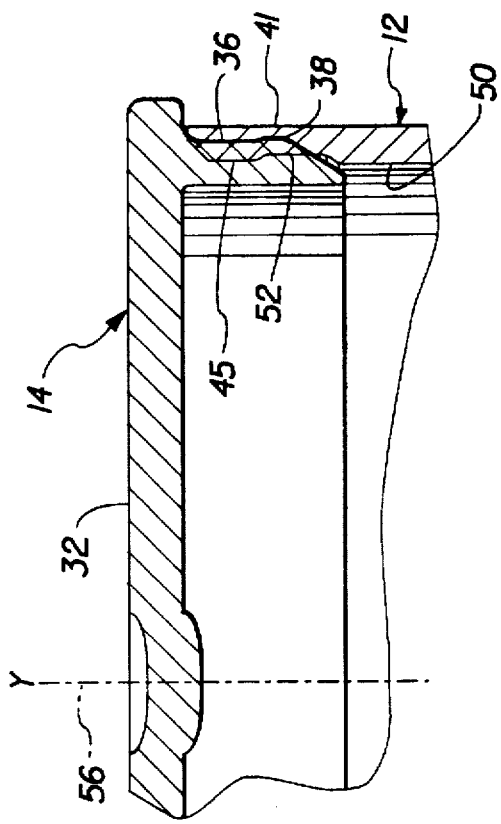
FIG. 6 is an enlarged and exaggerated cross sectional view of the film canister taken at section 6—6 of FIG. 5 showing in particular the sealing features of the present invention.
Figure 5:
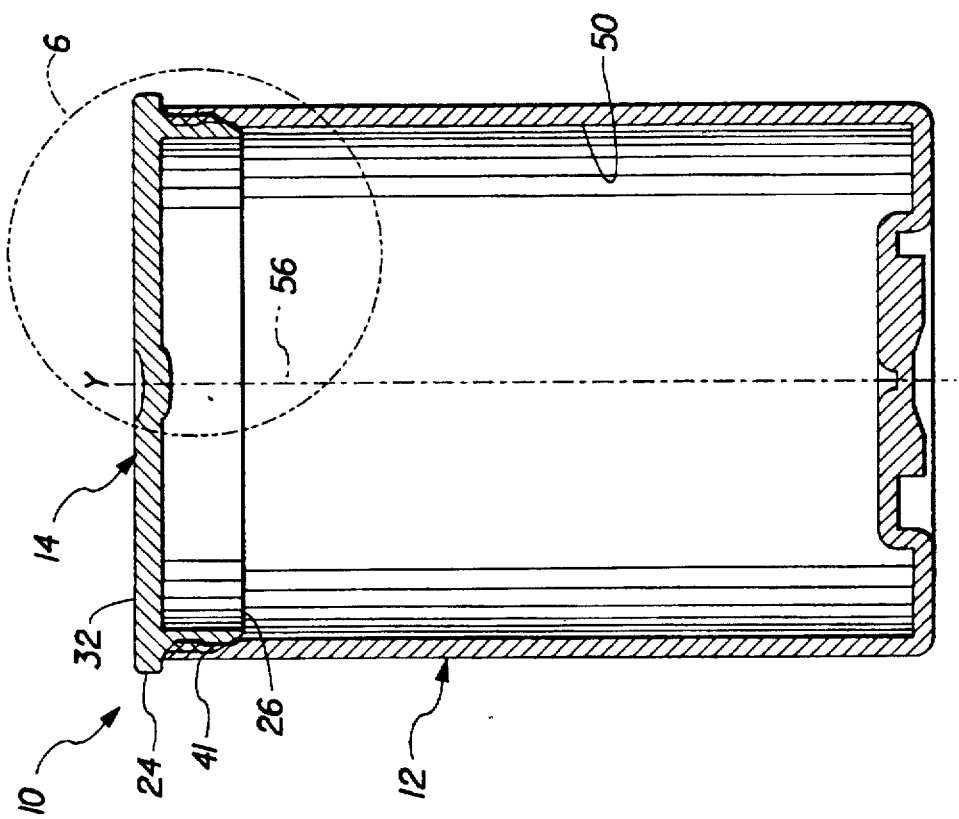
FIG. 5 is a cross sectional view of the film canister of FIGS. 1-4 showing the separate sealing and retention features of the container/cover interface.

Referring to FIGS. 5-7, the top necked portion 41 of the body 12 at the open end 46, FIG. 3, of the body 12 is defined by an oversized recessed portion 52 along the circumferential inner side wall 50 that extends radially outwardly about 0.006 to 0.010 inches (1.52 to 2.54 mm) from the radius of the inner side wall 50 to accommodate the rib retention member 38 of the engaging portion 26 of the cover 14. Above the recessed portion 52, a second sealing surface 45 is defined having a radius as measured from the center axis of the body 12 and which is less than the radius of the cover sealing surface 36, which is measured from the center axis of the cover 14. In this embodiment, as noted above, each of the body and cover geometries are defined by elliptical cross sections. However, other contours are easily imagined which provide a radial interference between sealing surfaces 36, 45. When assembled, the cover center axis is coincident with the center of the body, therefore, the radii of the sealing surfaces 36, 45 are measured from the same point, that is from a common vertical center axis 56. Preferably, a radial interference of about 0.010 to about 0.020 inches (2.54 to 5.08 mm) between the two sealing surfaces 36, 45 is sufficient to seal at a Moisture Vapor Transmission Rate (MVTR) of about 0.24 mg/wk Torr. The radial overlapping is clearly illustrated in FIG. 6, in order to show the sealing features of the container 10.

The described design allows the seal area defined by the cylindrical sealing surfaces 36, 45 between the cover 14 and the body 12 of the container 10, respectively, to provide radial interference and maximum surface area to surface area contact in order to provide adequate MVTR protection, while also independently and uncomprisingly allowing the cover 14 to be retained by the body 12 due to the interface between the rib member 38 and the oversized groove 52.

Most preferably, and now referring to FIG. 4, the rib retaining member 38 can be made discontinuous by locally removing a small circumferential vent portion. In the present embodiment in which the container 10 is provided with an elliptical cross section, it is preferred that the locally removed vent portion 42 be provided along the minor axis of the defined ellipse. The vent portion 42 provides a path for internal pressure to be vented from the interior of the container 10, causing the cover 14 to remain retained at higher altitudes (equivalent to 33,000 feet above sea level) without significant increases in opening force, even after applying an opening force at sea level after the container has been at higher altitudes. The inner wall is provided with a chamfer 54 preferably to allow ease in placement of the cover 14 onto the open end of the body 12.

Parts list for FIGS. 1-7

10 film canister
12 body section
14 cover
24 upper lid portion
26 lower engaging section
30 thumb tab
32 flat top surface
36 seal surface
37 depending end portion
38 retaining rib member
41 top necked portion
42 vent
44 cavity
45 seal surface
46 open end
50 circumferential side wall
52 recess
54 chamfer
56 vertical axis The invention has been described with reference to a preferred embodiment. However, it will be appreciated that variations and modifications can be effected without departing from the scope of the invention; for example, it should be readily apparant that the container described, having separate sealing and retaining features which can be optimized depending on the product being stored therein, should not be limited to an elliptical cross section; that is, a container having similar features which can be provided for a container having a circular or other cross section.

We claim:

1. A container for use with a photographic film cassette, said container comprising:

a body having an interior sized to retain a film cassette and an open end, said body having an inner recessed portion adjacent said open end and a body sealing surface adjacent said inner recessed portion;

a cover for engaging said open end of said body and sealing said interior of said body from moisture and dust, said cover including a circumferential rib member for engaging said inner recessed portion of said body to releasably secure said cover to said body, said rib member having at least one discontinuous circumferential section to allow interior venting from said body, said cover including a cover sealing surface for engaging said body sealing surface, said cover sealing surface having a radius when said cover is disengaged from said body, greater than the radius of said body sealing surface when said cover is disengaged from said body.

2. A container as recited in claim 1, wherein said circumferential rib member is disposed beneath said sealing surface of said cover.

3. A container as recited in claim 1, wherein said cover is a plug wherein said circumferential rib member and said cover sealing surface are each located to engage the interior of said body.

4. A container as recited in claim 1, wherein said container is reusable.

5. A container as recited in claim 1, wherein said container has a substantially elliptical cross section.

6. A container as recited in claim 5, wherein said at least one discontinuous section is located on the minor axis of the ellipse defining the cross section of the container.

7. A container for a photographic film comprising:

a body and a cover;

said body having an inner wall and an open end, said body having a recess disposed along said inner wall for releasably securing said cover to said body, said body having a body sealing surface disposed along said inner wall;

said cover having an engageable portion for engaging said open end of said body, said engageable portion including a circumferential rib member for engaging said recess, said recess having an axial dimension greater than the axial dimension of said circumferential rib member to allow movement over a range of positions while maintaining securement of said cover to said body, said circumferential rib member containing at least one discontinuous section for allowing venting from the interior of the container, said engageable portion including a cover sealing surface for engaging said body sealing surface, said cover sealing surface being sized to provide an interference fit with said body sealing surface to tightly seal the interior of said container from moisture, light, and dust.

8. A container as recited in claim 7, wherein said circumferential rib member and said recess are disposed below said sealing surfaces when said container is in an upright position.

9. A container as recited in claim 7, wherein said container has a substantially elliptical cross section.

10. A container as recited in claim 7, wherein said container has a substantially circular cross section.

11. A container as recited in claim 7, wherein said container is reusable.

12. A container comprising:

a body and a cover, said body having an opening at one end, said body defining an axis substantially perpendicular to said opening, said body having a sealing surface adjacent said opening and a recess adjoining and below said sealing surface, said cover having a sealing surface and a rib, said cover defining an axis, said rib being disposed adjoining said sealing surface, said rib extending radially outward beyond said cover sealing surface, said cover being movable relative to said body between an open state and a closed state;

in said open state, said cover and said body being disengaged;

in said closed state, said axes being superimposed, said body sealing surface and said cover sealing surface being engaged in an interference fit, said body sealing surface and said cover sealing surface independently sealing said body and said cover; and in said closed state, said rib and said recess independently retaining said cover on said body.

13. The container of claim 12 wherein said rib extends radially outward relative to said cover sealing surface from about 0.002 inches to about 0.006 inches and said recess extends radially outward relative to said body sealing surface from about 0.006 inches to about 0.010 inches.

14. The container of claim 12 wherein said sealing is at a moisture vapor transmission rate of about 0.24 mg/wk Torr.

15. The container of claim 12 wherein said cover has a depending end tapering inwardly from said rib.

16. The container of claim 12 wherein said rib is disposed beneath said sealing surface of said cover when said container is in an upright position.

17. The container of claim 12 wherein said cover is a plug and said rib and said cover sealing surface are each located to engage the interior of said body.

18. The container of claim 12 wherein said container has a substantially elliptical cross section.

19. The container of claim 12 wherein said recess has an axial dimension greater than the axial dimension of said rib to allow movement over a range of positions while maintaining securement of said cover to said body.

20. The container of claim 12 wherein said rib contains at least one discontinuous section for allowing venting from the interior of the container.

* * * * *